US007855350B2

(12) United States Patent
Schürmann et al.

(10) Patent No.: US 7,855,350 B2
(45) Date of Patent: Dec. 21, 2010

(54) APPARATUS AND METHOD FOR CLAMPING SHEET-METAL COMPONENTS

(75) Inventors: Bert Schürmann, Gernsbach (DE); Georg Spörl, Rheinstetten (DE)

(73) Assignee: Precitec KG, Gaggenau-Bad Rotenfels (DE)

( * ) Notice: Subject to any disclaimer, the term of this patent is extended or adjusted under 35 U.S.C. 154(b) by 589 days.

(21) Appl. No.: 11/724,307

(22) Filed: Mar. 15, 2007

(65) Prior Publication Data
US 2007/0221637 A1    Sep. 27, 2007

(30) Foreign Application Priority Data
Mar. 27, 2006    (DE)    ........................ 10 2006 014 068

(51) Int. Cl.
*B23K 26/20* (2006.01)
*B23Q 3/06* (2006.01)

(52) U.S. Cl. .......................... 219/121.63; 219/121.64; 219/161

(58) Field of Classification Search ............ 219/121.63, 219/121.64, 121.78, 161; 228/44.3; 407/107; 408/103, 108, 109; 76/78.1; 269/20, 24, 269/27; 72/295, 296, 297, 311
See application file for complete search history.

(56) References Cited

U.S. PATENT DOCUMENTS

| | | | | |
|---|---|---|---|---|
| 3,632,957 A | * | 1/1972 | Hannah | 219/119 |
| 3,823,299 A | * | 7/1974 | Metcalfe et al. | 219/110 |
| 4,168,430 A | * | 9/1979 | Denis et al. | 250/338.1 |
| 5,254,828 A | * | 10/1993 | Stiebel | 219/110 |
| 5,349,151 A | * | 9/1994 | Eisbrenner et al. | 219/89 |
| 5,499,755 A | * | 3/1996 | Myers et al. | 228/44.3 |
| 6,294,750 B1 | * | 9/2001 | Al-Nabulsi | 219/89 |
| 6,965,091 B2 | * | 11/2005 | Terada et al. | 219/121.63 |

FOREIGN PATENT DOCUMENTS

| | | | |
|---|---|---|---|
| CH | 661887 A | * | 8/1987 |
| DE | 44 03 999 C2 | | 8/1995 |
| DE | 101 16 402 C2 | | 10/2002 |

(Continued)

OTHER PUBLICATIONS machine translation of Japan Patent No. 7-100,884, Feb. 2010.*

(Continued)

*Primary Examiner*—Geoffrey S Evans
(74) *Attorney, Agent, or Firm*—Birch, Stewart, Kolasch & Birch, LLP

(57) ABSTRACT

An apparatus is provided for clamping components during machining, in particular during welding of sheet-metal components arranged in two or multiple layers. The apparatus includes a holder for a machining head, in particular for a laser machining head, a pressure-exerting element fitted on the holder in a movable fashion relative thereto, a pressure-exerting device provided operatively between the holder and the pressure-exerting element and having a first actuating element for moving the pressure-exerting element relative to the holder into a first direction, and a second actuating element for moving the pressure-exerting element into a second direction which is opposite to the first direction, and a force-setting device for controlling the pressure-exerting device in order to set a clamping force. During welding, the clamping force is exerted on the sheet-metal components by the pressure-exerting element.

30 Claims, 3 Drawing Sheets

FOREIGN PATENT DOCUMENTS

Figure 1:
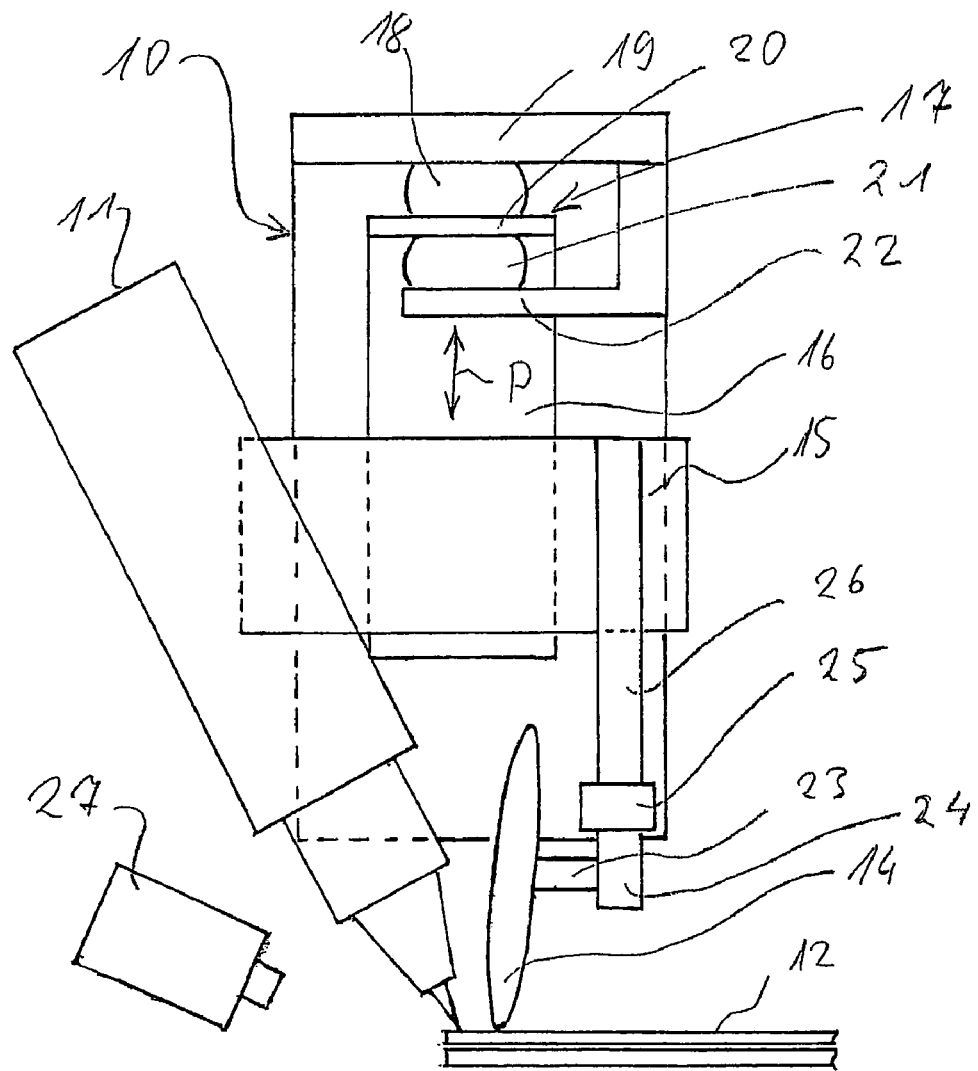

| | | | |
|---|---|---|---|
| DE | 10 2004 059 830 B3 | | 12/2004 |
| EP | 0 892 692 B1 | | 1/1999 |
| EP | 1 249 304 B1 | | 10/2002 |
| EP | 1574275 A2 | * | 9/2005 |
| GB | 2398361 A | * | 8/2004 |
| JP | 11226763 A | * | 8/1989 |
| JP | 2-235591 A | * | 9/1990 |
| JP | 7-100884 A | * | 4/1995 |
| JP | 8-206846 A | * | 8/1996 |
| JP | 11-058048 A | * | 3/1999 |
| JP | 2002-35953 A | * | 2/2002 |
| JP | 2002-066777 A | * | 3/2002 |
| JP | 2004-98186 A | * | 4/2004 |
| JP | 2004-130323 A | * | 4/2004 |
| WO | WO-97/37808 A1 | | 10/1997 |

OTHER PUBLICATIONS machine translation of Japan Patent No. 8-206,846, Feb. 2010.*
machine translation of Japan Patent No. 2002-35,953, Feb. 2010.*
machine translation of Japan Patent No. 2004-98,186, Feb. 2010.*

* cited by examiner

APPARATUS AND METHOD FOR CLAMPING SHEET-METAL COMPONENTS

The invention relates to an apparatus and a method for clamping sheet-metal components during machining, in particular during welding of sheet-metal components arranged in two or multiple layers.

DE 10 2004 059 830 B3 discloses an apparatus for producing and/or maintaining a gap for joining more than two metal sheets which are clamped on one another in a clamping device and have cross sections resembling flanges and/or flat cross sections, there being provided between the edges or flanges of the metal sheets for the purpose of producing a gap elements which can be pressed in and which, together with clamping jaws, clamp the metal sheets which are to be joined, in particular to be welded by means of a laser, while producing a defined gap.

Furthermore, EP 0 892 692 B1 discloses an apparatus for welding and/or cutting workpieces, in particular metal sheets by means of laser radiation, in the case of which a laser machining head is fitted together with a press roller on a hand of an industrial robot. The press roller and laser machining head are rigidly connected to one another in a vertical direction such that the laser machining head and thus the focus of the laser beam are automatically positioned relative to the workpiece surface as soon as the press roller is seated on the surface of the workpiece lying above. The vertical displacement is performed in this case either by the hand of the industrial robot or by a slide which can be displaced in a vertical direction. In the horizontal direction, that is in the direction parallel to the surface of the workpiece, the laser machining head is mounted such that it can be displaced relative to the press roller such that it can be followed up in relation to the seam as a function of the output signals of a seam detector.

DE 44 03 999 C2 discloses another apparatus for welding sheet-metal components in two or multiple layers along an interrupted or continuous weld seam, in the case of which there are arranged on an apparatus frame a laser machining head for welding sheet-metal components, and a clamping roller for compressing the sheet-metal components. The apparatus frame can be fitted on an industrial robot or a gantry installation or the like, in order to be guided thereby along a desired weld seam. During welding along a two- or three-dimensionally running weld seam, the clamping roller compresses the metal sheets to be welded, doing so without the need for complicated supporting devices or mating holding rollers.

The contact pressure of the clamping roller is controlled in this case by a pneumatic cylinder such that the components can be adequately pressed against one another without the presence of an opposing holder, in order to produce a defined gap, or to eliminate the gap between the components.

Since the force which is exerted on the workpiece is determined not only by the inherent weight of the apparatus and the pressure in the pneumatic cylinder, but also by the direction of the force of gravity relative to the position of the apparatus frame, and by the state of movement of the piston in the pneumatic cylinder, the force which is exerted on the workpiece can be controlled only poorly. In particular, the known stick-slip effect, that is to say the transition from static friction to sliding friction, renders the force actually applied extremely dependent on movement. It is particularly problematic in this case that when the piston is stationary in the pneumatic cylinder it is necessary to apply a large force in order to overcome the static friction and to enter the sliding state such that the piston can be moved. If this force is introduced by the clamping roller into the workpiece, plastic deformations, and thus damage to the workpiece can occur, and this is not acceptable.

It is the object of the invention to provide a further apparatus and a further method of the type mentioned at the beginning which apparatus or which method enable components, in particular sheet-metal components, to be pressed in a controlled fashion without the risk of damaging them.

Thus, according to the invention an apparatus for clamping components which has a holder for a machining head and a pressure-exerting element which can move on the holder relative thereto, comprises a pressure-exerting device which is provided operatively between holder and pressure-exerting element and having a first actuating element for moving the pressure-exerting element relative to the holder into a first direction, and a second actuating element for moving the pressure-exerting element into a second direction which is opposite to the first direction, and a force-setting device which controls the pressure-exerting device appropriately in order to set the clamping force.

Owing to the counterplay between the two actuating elements, it is possible to avoid a sudden rise in the clamping force which could have a sudden undesirably high overshooting of the set clamping force as a consequence, since the force is transmitted from one actuating element not only to the pressure-exerting element, but also to the other actuating element. It is thereby possible to prevent damage to the components.

It is provided in an advantageous development of the invention that the first and second actuating elements of the pressure-exerting device are hydraulic or pneumatic actuating elements, hydraulic or pneumatic contraction or expansion elements being provided as actuating elements of the pressure-exerting device. Hydraulic and pneumatic contraction or expansion elements have the advantage that they require for the transmission of force no components which can be displaced against one another and engage frictionally with one another.

It is particularly expedient when pressure fluid can be applied from a hydraulic or pneumatic pressure source to the first and second actuating elements via an electrically controllable valve arrangement of the force-setting device, the electrically controllable valve arrangement advantageously comprising a proportional valve.

Although it is conceivable in principle to mount the pressure-exerting element on the holder by means of a swivel arm or the like, it is, however, preferred for the pressure-exerting element to be fitted on the holder in a linearly displaceable fashion.

It is also possible to make use as pressure-exerting element of slide rails or the like, but it is particularly expedient when a pressure-exerting roller is provided as pressure-exerting element.

In order not only to avoid sudden rises in the clamping force, but also to keep the latter at a value favourable for the respective machining, it is provided in a preferred refinement of the invention that a force sensor is provided which detects a clamping force exerted by the pressure-exerting element on the component and whose output signal corresponding to the detected clamping force is fed to the force-setting device, which controls the pressure-exerting device as a function of the output signal of the force sensor in order to set the clamping force to a desired value. It is thereby possible for damage to the components to be reliably prevented.

A further advantageous refinement of the invention is distinguished in that the force-setting device comprises a force-setting circle which compares the output signal, corresponding to the detected clamping force, of the force sensor with the desired value of the clamping force, and which supplies a control signal to the valve arrangement in order to control the pressure fluid feed from the hydraulic or pneumatic pressure source to the pressure-exerting device such that the clamping force is regulated to its desired value.

It is particularly easy to regulate the clamping force when the desired value of the clamping force can be permanently prescribed for a machining operation.

Particularly in the case of complicated three-dimensional continuous or discontinuous running of the machining line, that is to say of a desired weld seam, for example, it is, however, also conceivable to determine the respective requisite contact forces during a test machining operation and to store them as a function of travel such that it is then possible in production operation for the desired value of the clamping force to be variably prescribed for the machining operation in accordance with the machining cycle.

In order to avoid complicated learning processes of the desired value of the clamping force, which depends on the machining cycle, and in order to be able to adapt the clamping force even more effectively to the requirements occurring during the machining operation, it is provided in the case of another refinement of the invention that provided for the purpose of observing at least one property of a machining path right in front of a current machining area, in particular for observing the width of a gap between two sheet-metal components to be welded, is a monitoring device, preferably an optical monitoring device, in particular a video camera with an associated image processing device which varies the desired value of the clamping force during a machining operation in accordance with the detected property of the machining path, in particular in accordance with the detected gap width.

In order to be able to conform to the machining line with extreme accuracy, and thus to preserve a high quality of machining, it is provided in the case of another exemplary embodiment of the invention that the machining head is fitted on the holder in a fashion which can be moved relative to the pressure-exerting device, the movement of the machining head relative to the pressure-exerting device and transverse to the machining line being performed as a function of an output signal of the monitoring device which corresponds to the course of the machining line.

Thus, according to the invention for clamping components during machining by means of a machining head the sheet-metal components are pressed against one another with the aid of a pressure-exerting element in the region of a machining zone, wherein, in order to set the exerted clamping force, the pressure-exerting element is moved in a first direction relative to the holder by a force-setting device by means of a first actuating element, and in a second direction, opposite to the first direction, by means of a second actuating element, the first and second actuating elements being actuated hydraulically or pneumatically, in particular being contracted or expanded hydraulically or pneumatically in the direction of movement.

It is expedient for pressure fluid to be applied from a hydraulic or pneumatic pressure source to the first and second actuating elements via an electrically controlled valve arrangement, in particular via a proportional valve, of a force-setting device.

The setting of the contact force can be regulated with particular ease when the pressure-exerting element is linearly displaced in a fashion substantially perpendicular to the components and relative to a holder for the machining head which is fitted on an industrial robot.

It is provided in the case of an advantageous refinement of the method according to the invention that the clamping force exerted by the pressure-exerting element on the sheet-metal components is detected, the detected clamping force is compared with a desired value, and the exerted clamping force is regulated in accordance with the result of comparison, in order to keep it constant.

It is expedient in this case when the exerted clamping force is detected by means of a force sensor whose output signal corresponding to the detected clamping force is compared by a force-setting circle with the desired value of the clamping force, and when a control signal corresponding to the result of comparison is supplied by the force-setting circle to a valve arrangement in order to control the pressure fluid feed from the hydraulic or pneumatic pressure source to the actuating elements such that the clamping force is regulated to its desired value.

In the simplest case, the desired value of the clamping force can be permanently prescribed for a machining operation. However, it is also possible for the desired value of the clamping force to be variably prescribed for a machining operation in accordance with the machining cycle. The determination of the desired value dependent on the machining cycle can be performed in this case by means of trials (teach ins).

However, it is advantageous when at least one property of a machining path is monitored right in front of a current machining area, in particular the width of a gap between two sheet-metal components to be welded, by means of a monitoring device, preferably an optical monitoring device, in particular a video camera with an associated image processing device.

In this case, the desired value of the clamping force can be varied during a machining operation in accordance with the detected property of the machining path, in particular in accordance with the detected gap width.

If the machining head can be moved relative to the pressure-exerting device, the latter can be moved transverse to the machining line as a function of an output signal of the monitoring device which corresponds to the course of the machining line.

Figure 2:
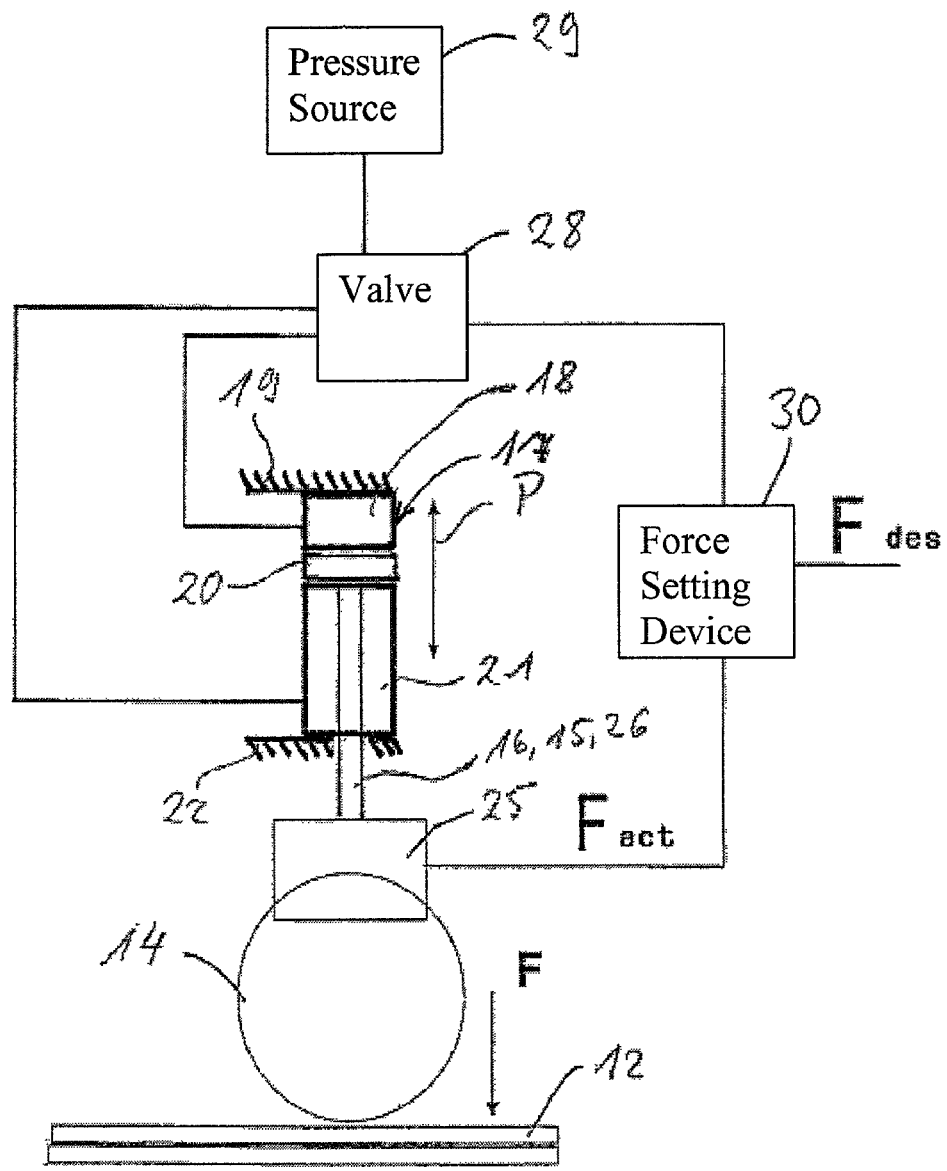
Figure 3:
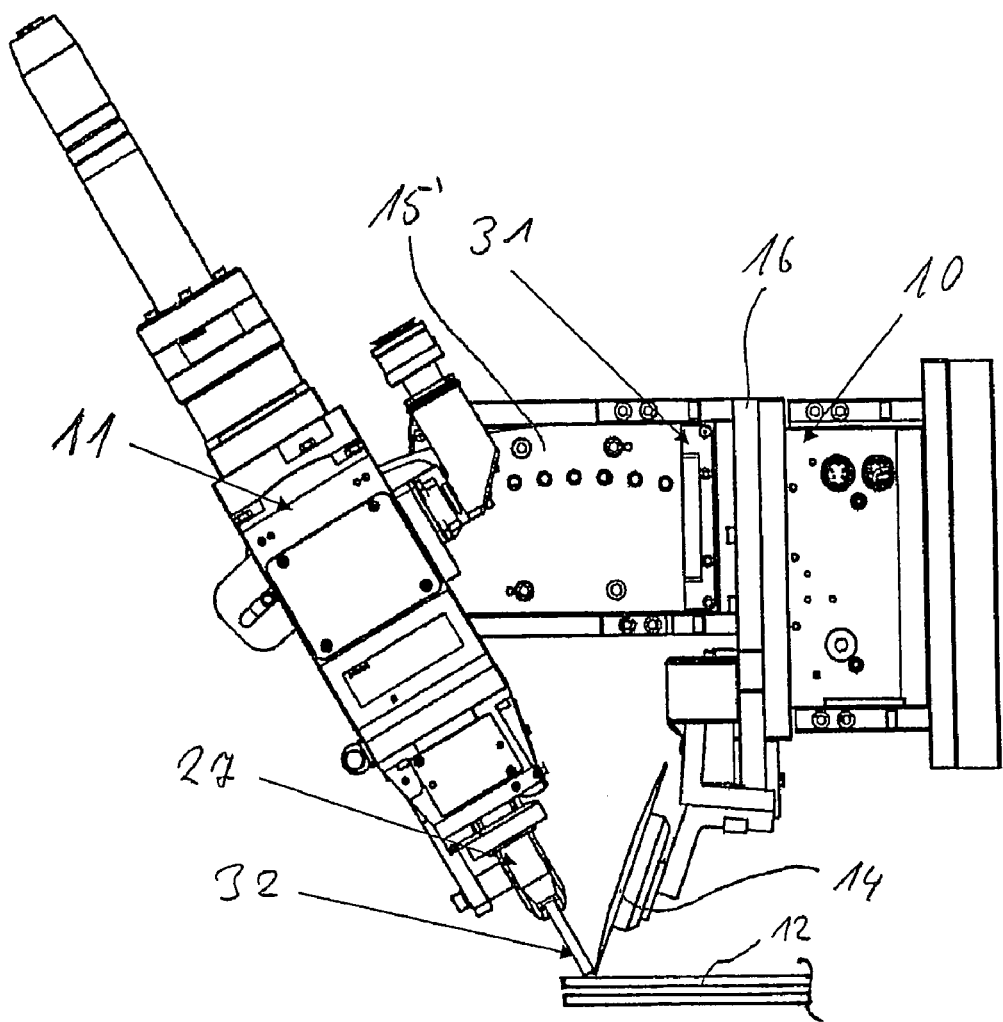

The invention is explained in more detail below by way of example with the aid of the drawing, in which:

FIG. 1 shows a greatly simplified diagrammatic view of a clamping apparatus according to the invention, FIG. 2 shows a block diagram intended to illustrate the control of the apparatus according to the invention, and FIG. 3 shows a simplified diagrammatic view of another clamping apparatus according to the invention.

Components corresponding to one another are provided with the same reference numerals in the various figures of the drawing.

As is illustrated in FIG. 1, a pressure-exerting roller 14 is provided on a holder 10 (indicated purely diagrammatically) for a machining head 11 as pressure-exerting element for clamping components 12. For the purpose of a common linear displacement with the machining head 11, the pressure-exerting roller 14 is fastened, for example via a mounting plate 15, on a slide 16 which is mounted on the holder 10 such that it can be displaced linearly in the direction of the double arrow P.

A pressure-exerting device 17 which is provided operatively between the holder 10 and the slide 16 bearing the pressure-exerting roller 14 comprises a first actuating element 18 which is arranged between a first supporting plate 19 on the holder 10 and a supporting plate 20 on the slide 16. A second actuating element 21 of the pressure-exerting device 17 is arranged between the supporting plate 20 on the slide 16 and a second supporting plate 22 on the holder 10.

In this case, the actuating elements can be any desired actuating elements which both respectively operate by compression or tension in order to displace the slide 16, which bears both the machining head 11 and the pressure-exerting roller 14, upwards or downwards in the drawing, that is to say perpendicular to the components 12 when the latter are being machined, and perpendicular to their machining line, in order to raise or to lower the contact force of the pressure-exerting roller 14. The two actuating elements 18, 21 are preferably hydraulic or pneumatic actuating elements which, upon pressure being applied, either expand or contract in the displacement direction P. In particular, it is possible to make use as actuating elements of so-called hydraulic or pneumatic muscles.

Provided operationally between the pressure-exerting roller 14, which is held in a bearing 24 by means of an axle 23, and the slide 16 is a force sensor 25 which detects the clamping force $F_{act}$ actually exerted on the component 12 by the pressure-exerting roller 14. The clamping or pressure-exerting roller 14 can be held on the slide 16 in any suitable way, and is indicated in FIG. 1 only purely diagrammatically by the mounting plate 15 and the support arm 26.

Furthermore, FIG. 1 further illustrates a monitoring device, in particular a video camera 27 with image processing, which is fitted in a way not shown in more detail on the machining head 11 or on the holder 10, in order to observe the machining area, and in order, in particular, to detect the gap width between the components 12, in particular shortly before the current machining site, and to supply correction values for the requisite contact force, if appropriate.

As is illustrated diagrammatically in FIG. 2, the required operating pressure is applied by a pressure source 29 to the two hydraulic or pneumatic actuating elements 18, 21 via a valve arrangement 28, which is a proportional valve, in particular, in order to effect a displacement of the pressure-exerting roller 16 in the direction of the double arrow P, and thus to attain a change in the clamping force F. Instead of a proportional valve 28, it is possible to provide any other suitable valve arrangement which permits the two hydraulic or pneumatic actuating elements 18, 21 to be acted upon so that they cooperate to displace the pressure-exerting roller 16 in the manner of a muscle and its antagonist.

In order to regulate the clamping force F, in addition to the proportional valve 28 the force-setting device has a force-setting circle 30 which, in addition to an output signal of the force sensor 25 corresponding to the detected clamping force $F_{act}$, is fed a desired value $F_{des}$ corresponding to the desired clamping force F. Here, the desired value $F_{des}$ of the clamping force F is in the simplest case a fixed value which can be prescribed in accordance with the components 12 to be machined.

If, for example, the aim is to weld two relatively thin metal sheets to one another with the aid of a laser machining head, the desired value $F_{des}$ is set to be small in accordance with the thickness of the metal sheets, in order on the one hand to succeed in reliably pressing the metal sheet on top in FIG. 2 against the lower metal sheet so as to set or eliminate the gap lying therebetween, and on the other hand, however, to prevent the force introduced into the sheet-metal component by means of the pressure-exerting roller 14 from resulting in a plastic deformation and thus in damage to the component. If relatively thick metal sheets are being machined, the desired value $F_{des}$ of the clamping force F can be set to a higher value.

However, it is also conceivable for the desired value for the clamping force F to be prescribed variably in accordance with a machining cycle, it being possible to determine this desired value with the aid of trials as a function of the machining path, that is to say for example as a function of the course of the weld seam.

When use is made of a monitoring device such as, for example, a video camera 27 with integrated or downstream image processing and image detection, it is also possible to vary the desired value $F_{des}$ for the clamping force F as a function of the gap width upstream of the machining site, that is to say to enlarge it whenever the gap upstream of the machining site is too large, or else to reduce it when the desired contact pressure is reached. However, it should expediently be provided here that the desired value $F_{des}$ of the clamping force F may not exceed a maximum value in particular as a function of the material to be machined.

If the aim is for two or more metal sheets to be welded to one another, in the simplest case the first step is to set a desired value $F_{des}$ of the clamping force F selected in accordance with the metal sheets to be welded, and supply it to the force-setting circle 30. During the machining operation, that is to say during welding, the industrial robot (not illustrated) or an appropriate gantry installation then moves the machining head 11 into a prescribed machining position in order then to guide the machining head 11 in three dimensions along the desired weld seam. In this case, the holder 10 is orientated respectively such that it is held perpendicular to the machining line, that is to say to the desired weld seam. If, for example, as a consequence of stresses occurring during machining the sheet-metal components 12 do not lie tightly on one another, the upper sheet-metal component 12, that is to say the one opposite the machining head 11, is clamped by the pressure-exerting roller 14 against the other sheet-metal component(s). The clamping force F occurring in this case is detected by the force sensor 25 which supplies the force-setting circle 30 with an output signal corresponding to the clamping force $F_{act}$ actually exerted. Said force-setting circle compares the output signal of the force sensor 25 with the desired value $F_{des}$ of the clamping force, and supplies an appropriate actuating signal to the proportional valve 28. The latter controls the pressure feed from the pressure source 29 to the two hydraulic or pneumatic actuating elements 18, 21 in such a way that the pressure-exerting roller 14 is either moved in the direction of the components 12 in order to raise the clamping force F, or is moved therefrom when the force is to be reduced.

The result of monitoring the clamping force F actually exerted by the pressure-exerting roller 14 on the components 12 in combination with the actuating elements 18, 21, operating in opposite senses, of the pressure-exerting device 17 is that the contact force is always kept in a range in which it still cannot effect plastic deformation of the components. In particular, a sudden excessive overshooting of the desired value which could occur despite regulation of the contact pressure when use is made of hydraulic or pneumatic piston cylinder arrangements as pressure-exerting device is prevented.

FIG. 3 shows another exemplary embodiment of the invention, in the case of which the machining head 11 is mounted via a mounting plate 15' on a slide 31 which is fastened on a first slide 16 together with the pressure-exerting roller 14 for the purpose of a joint vertical displacement. As in the case of the first exemplary embodiment of the invention, the slide 16 is fitted on the holder 10 and can be displaced by means of a pressure-exerting device (not illustrated in more detail in FIG. 3).

The second slide 31 enables a horizontal displacement of the machining head 11, that is to say a displacement parallel to the component 12 relative to the pressure-exerting roller 14, such that the position of the laser beam 32, and thus the position of its point of impingement on the component 12, can be displaced relative to the standing region of the pressure-exerting roller. If a monitoring apparatus such as, for example, a so-called seam detector or a video camera, is fitted on the machining head, the point of impingement of the laser beam 32 can be displaced transverse to the machining line in order to be able to cancel out tolerances during machining.

The displacement of the laser machining head in a horizontal direction, that is to say in a direction parallel to the components 12, is effected by an actuating element (not illustrated in more detail) or by two oppositely acting actuating elements such as are also provided for the vertical adjustment, that is to say the adjustment in a direction perpendicular to the components.

The apparatus according to FIG. 3 operates as described above with the aid of FIGS. 1 and 2 with reference to the clamping of the components by means of the clamping or pressure-exerting roller 14, which can also be replaced by another suitable pressure element in the case of this exemplary embodiment of the invention. In the refinement according to FIG. 3, the machining head can be displaced horizontally, that is to say parallel to the component, such that the point of impingement of the laser beam 32 on the component 12 can be set in a variable fashion relative to the pressure-exerting roller 14.

If, as illustrated, a monitoring apparatus, in particular a video camera 27, is provided, it is also possible subsequently to regulate the position relative to the machining line in real time, in order always to align the machining head correctly in relation to the machining line such that the laser beam follows the machining line exactly.

The invention claimed is:

1. An apparatus for clamping components during welding of sheet-metal components arranged in two or multiple layers, having
   a holder for a laser machining head which can be fitted on an industrial robot in order to guide the laser machining head along a machining line,
   a pressure-exerting element which is fitted on the holder in a movable fashion relative thereto,
   a pressure-exerting device which is provided operatively between the holder and the pressure-exerting element and has a first actuating element for moving the pressure-exerting element relative to the holder into a first direction, and a second actuating element for moving the pressure-exerting element into a second direction which is opposite to the first direction,
   a force-setting device which controls the pressure-exerting device appropriately in order to set the clamping force (F), and
   a force sensor which detects a clamping force exerted by the pressure-exerting element on the component and whose output signal corresponding to the detected clamping force ($F_{act}$) is fed to the force-setting device, which controls the pressure-exerting device as a function of the output signal of the force sensor in order to set the clamping force (F) to a desired value ($F_{des}$), wherein the force sensor is provided operationally between the pressure-exerting element and the pressure-exerting device.

2. The apparatus according to claim 1, wherein the first and second actuating elements of the pressure-exerting device are hydraulic or pneumatic actuating elements.

3. The apparatus according to claim 2, wherein hydraulic or pneumatic contraction or expansion elements are provided as actuating elements of the pressure-exerting device.

4. The apparatus according to claim 2, wherein pressure fluid can be applied from a hydraulic or pneumatic pressure source to the first and second actuating elements via an electrically controllable valve arrangement of the force-setting device.

5. The apparatus according to claim 4, wherein the electrically controllable valve arrangement comprises a proportional valve.

6. The apparatus according to claim 1, wherein the pressure-exerting element is fitted on the holder in a linearly displaceable fashion.

7. The apparatus according to claim 1, wherein a pressure-exerting roller is provided as the pressure-exerting element.

8. The apparatus according to claim 1, wherein the machining head is fitted on the holder in a fashion which can be moved relative to the pressure-exerting device.

9. The apparatus according to claim 1, wherein the force-setting device comprises a force-setting circuit which compares the output signal, corresponding to the detected clamping force ($F_{act}$), of the force sensor with the desired value ($F_{des}$) of the clamping force (F), and which supplies a control signal to the valve arrangement in order to control the pressure fluid feed from the hydraulic or pneumatic pressure source to the pressure-exerting device such that the clamping force (F) is regulated to its desired value ($F_{des}$).

10. The apparatus according to claim 9, wherein the desired value ($F_{des}$) of the clamping force (F) can be permanently prescribed for a machining operation.

11. The apparatus according to claim 9, wherein the desired value ($F_{des}$) of the clamping force (F) can be variably prescribed for a machining operation in accordance with the machining cycle.

12. An apparatus for clamping components during welding of sheet-metal components arranged in two or multiple layers, having
   a holder for a laser machining head which can be fitted on an industrial robot in order to guide the laser machining head along a machining line,
   a pressure-exerting element which is fitted on the holder in a movable fashion relative thereto,
   a pressure-exerting device which is provided operatively between holder and pressure-exerting element and has a first actuating element for moving the pressure-exerting element relative to the holder into a first direction, and a second actuating element for moving the pressure-exerting element into a second direction which is opposite to the first direction, and
   a force-setting device which controls the pressure-exerting device appropriately in order to set the clamping force (F),
   wherein provided for the purpose of observing at least one property of a machining path right in front of a current machining area, is an optical monitoring device with an associated image processing device which varies the desired value ($F_{des}$) of the clamping force (F) during a machining operation in accordance with the detected property of the machining path, in particular in accordance with the detected gap width.

13. The apparatus according to claim 12, wherein the movement of the machining head relative to the pressure-exerting device and transverse to the machining line is performed as a function of an output signal of the monitoring device which corresponds to the course of the machining line.

14. The apparatus according to claim 12, wherein the at least one property of a machining path is the width of a gap between two components to be welded.

15. The apparatus according to claim 12, wherein the optical monitoring device is a video camera.

16. A method for clamping components during welding of sheet-metal components arranged in two or multiple layers by a machine head, in the case of which the components are pressed against one another by a pressure-exerting element in the region of a machining zone, in particular a welding zone, in which, in order to set the exerted clamping force (F), the clamping force (F) exerted by the pressure-exerting element on the sheet-metal components is detected, the detected clamping force ($F_{act}$) is compared with a desired value ($F_{des}$), and the exerted clamping force (F) is regulated in accordance with the result of comparison, by moving the pressure-exerting element in a first direction relative to the holder by a force-setting device by a first actuating element of a pressure-exerting device, and in a second direction, opposite to the first direction, by a second actuating element of the pressure-exerting device, wherein the clamping force (F) is detected by a force sensor whose output signal corresponding to the detected clamping force ($F_{act}$), and the force sensor is provided operationally between the pressure-exerting element and the pressure-exerting device.

17. The method according to claim 16, wherein the first and second actuating elements are actuated hydraulically or pneumatically.

18. The method according to claim 17, wherein pressure fluid is applied from a hydraulic or pneumatic pressure source to the first and second actuating elements via an electrically controlled valve arrangement of a force-setting device.

19. The method according to claim 18, wherein the electrically controllable valve arrangement comprises a proportional valve.

20. The method according to claim 17, wherein the actuating elements are contracted or expanded hydraulically or pneumatically in the direction of movement.

21. The method according to claim 16, wherein the pressure-exerting element is linearly displaced in a fashion substantially perpendicular to the components and relative to a holder for the machining head which is fitted on an industrial robot or the like.

22. The method according to claim 16, wherein the detected clamping force ($F_{act}$) is compared by a force-setting circuit of the force-setting device with the desired value ($F_{des}$) of the clamping force (F), and a control signal corresponding to the result of comparison is supplied by the force-setting circuit to a valve arrangement in order to control the pressure fluid feed from the hydraulic or pneumatic pressure source to the actuating elements such that the clamping force (F) is regulated to its desired value ($F_{des}$).

23. The method according to claim 22, wherein the desired value ($F_{des}$) of the clamping force (F) is permanently prescribed for a machining operation.

24. The method according to claim 22, wherein the desired value ($F_{des}$) of the clamping force (F) is variably prescribed for a machining operation in accordance with the machining cycle.

25. A method for clamping components during welding of sheet-metal components arranged in two or multiple layers by a machine head, in the case of which the components are pressed against one another by a pressure-exerting element in the region of a machining zone, in particular a welding zone, in which, in order to set the exerted clamping force (F), by moving the pressure-exerting element in a first direction relative to the holder by a force-setting device by a first actuating element, and in a second direction, opposite to the first direction, by a second actuating element, wherein at least one property of a machining path is monitored right in front of a current machining area by an optical monitoring device with an associated image processing device.

26. The method according to claim 25, wherein the desired value ($F_{des}$) of the clamping force (F) is varied during a machining operation in accordance with the detected property of the machining path.

27. The method according to claim 26, wherein the desired value ($F_{des}$) of the clamping force (F) is varied during the machining operation in accordance with the detected gap width.

28. The method according to claim 25, wherein the machining head is moved relative to the pressure-exerting device and transverse to the machining line as a function of an output signal of the monitoring device which corresponds to the course of the machining line.

29. The method according to claim 25, wherein the at least one property of the machining path is the width of a gap between two sheet-metal components to be welded.

30. The method according to claim 25, wherein the optical monitoring device is a video camera.

* * * * *